(12) United States Patent
Rydnell et al.

(10) Patent No.: US 9,906,959 B2
(45) Date of Patent: Feb. 27, 2018

(54) OBTAINING AUTHORIZATION TO USE PROXIMITY SERVICES IN A MOBILE COMMUNICATION SYSTEM

(71) Applicant: Telefonaktiebolaget LM Ericsson (publ), Stockholm (SE)

(72) Inventors: Gunnar Rydnell, Gothenburg (SE); Roland Gustafsson, Bengtsfors (SE); Ann-Christine Sander, Gothenburg (SE); Shabnam Sultana, Montreal (CA); Stefan Karl Toth, Gothenburg (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/100,534

(22) PCT Filed: Apr. 29, 2015

(86) PCT No.: PCT/EP2015/059332
§ 371 (c)(1),
(2) Date: May 31, 2016

(87) PCT Pub. No.: WO2015/197236
PCT Pub. Date: Dec. 30, 2015

(65) Prior Publication Data
US 2016/0302072 A1    Oct. 13, 2016

Related U.S. Application Data

(60) Provisional application No. 62/018,561, filed on Jun. 28, 2014.

(51) Int. Cl.
*H04L 29/06* (2006.01)
*H04W 12/08* (2009.01)
(Continued)

(52) U.S. Cl.
CPC ............ *H04W 12/08* (2013.01); *H04J 11/00* (2013.01); *H04L 45/745* (2013.01);
(Continued)

(58) Field of Classification Search
CPC ... H04W 12/08; H04W 4/023; H04W 76/023; H04W 4/00; H04W 4/12; H04W 40/20;
(Continued)

(56) References Cited

U.S. PATENT DOCUMENTS

2013/0203378 A1* 8/2013 Vos .................... H04W 4/24
455/406
2013/0288668 A1* 10/2013 Pragada ............. H04W 12/06
455/426.1

(Continued)

FOREIGN PATENT DOCUMENTS

WO    WO 2015197236 A1 * 12/2015 ............ H04L 63/20

OTHER PUBLICATIONS

Telecom Italia et al., "Subscription Corrections," SA WG2 Meeting #101bis, S2-140754, Feb. 2014, 8 pages.
(Continued)

*Primary Examiner* — Mahendra Patel
(74) *Attorney, Agent, or Firm* — Rothwell, Figg, Ernst & Manbeck, P.C.

(57) ABSTRACT

The present invention relates to mobile communication systems, and more particularly to technology that enables a User Equipment (UE) to obtain authorization to use Proximity-based Services.
In a first aspect of the invention, a method is performed by a home network proximity service function (104) for authorizing a mobile terminal (100) to use a proximity service, comprising receiving a request from the mobile terminal to obtain proximity service authorization in at least one other network (107, 108), obtaining authorization information
(Continued)

from a proximity service function (103, 105) of the at least one other network for which proximity service authorization is requested, and providing the mobile terminal with authorization information required for authorization with said at least one other network for which the request is made.

37 Claims, 13 Drawing Sheets

(51) Int. Cl.
| | |
|---|---|
| H04W 4/20 | (2018.01) |
| H04J 11/00 | (2006.01) |
| H04L 12/741 | (2013.01) |
| H04L 29/12 | (2006.01) |
| H04W 4/02 | (2018.01) |
| H04W 8/08 | (2009.01) |
| H04W 8/12 | (2009.01) |
| H04W 48/16 | (2009.01) |
| H04W 72/12 | (2009.01) |
| H04W 4/00 | (2018.01) |
| H04W 36/00 | (2009.01) |
| H04W 88/02 | (2009.01) |
| H04W 88/14 | (2009.01) |
| H04W 88/16 | (2009.01) |

(52) U.S. Cl.
CPC .......... *H04L 61/2592* (2013.01); *H04L 63/20* (2013.01); *H04W 4/023* (2013.01); *H04W 4/20* (2013.01); *H04W 8/082* (2013.01); *H04W 8/12* (2013.01); *H04W 48/16* (2013.01); *H04W 72/1215* (2013.01); *H04W 4/008* (2013.01); *H04W 36/0038* (2013.01); *H04W 88/02* (2013.01); *H04W 88/14* (2013.01); *H04W 88/16* (2013.01)

(58) Field of Classification Search
CPC ... H04W 12/00; H04W 76/012; H04W 8/005; H04W 36/0038; H04W 4/008; H04W 88/02; H04W 88/16; H04W 88/14; H04J 11/00; H04L 45/745; H04L 61/2592; H04L 63/20; H04L 2001/0093; H04L 5/0035
USPC .......... 455/414.3, 436.1, 406; 370/328, 329; 726/4
See application file for complete search history.

(56) References Cited

U.S. PATENT DOCUMENTS

| | | | | |
|---|---|---|---|---|
| 2013/0290696 | A1* | 10/2013 | Broustis .................... | H04L 9/08 713/150 |
| 2014/0003373 | A1* | 1/2014 | Hakola .................... | H04W 48/16 370/329 |
| 2014/0004796 | A1* | 1/2014 | Cakulev .............. | H04W 76/023 455/41.2 |
| 2014/0056220 | A1* | 2/2014 | Poitau .................. | H04W 40/246 370/328 |
| 2014/0112270 | A1* | 4/2014 | Kuo ..................... | H04W 76/023 370/329 |
| 2014/0130137 | A1* | 5/2014 | Baek ..................... | H04W 12/08 726/4 |
| 2014/0141777 | A1* | 5/2014 | Guo ..................... | H04W 8/005 455/434 |
| 2014/0295815 | A1* | 10/2014 | Cho ..................... | H04W 40/20 455/418 |
| 2014/0301307 | A1* | 10/2014 | Lee ..................... | H04L 5/0055 370/329 |
| 2014/0335791 | A1 | 11/2014 | Kim et al. | |
| 2014/0357228 | A1 | 12/2014 | Luft et al. | |
| 2015/0063260 | A1 | 3/2015 | Kuo | |
| 2015/0264106 | A1 | 9/2015 | Baek et al. | |
| 2015/0289127 | A1 | 10/2015 | Ou et al. | |
| 2015/0289253 | A1 | 10/2015 | Pan et al. | |
| 2015/0327157 | A1 | 11/2015 | Al-Shalash | |
| 2016/0007187 | A1 | 1/2016 | Liao | |
| 2016/0014590 | A1* | 1/2016 | Agiwal ................. | H04W 8/005 455/426.1 |
| 2016/0014835 | A1 | 1/2016 | Wu | |
| 2016/0044006 | A1 | 2/2016 | Luft et al. | |
| 2016/0057793 | A1* | 2/2016 | Wang ..................... | H04W 8/26 370/329 |
| 2016/0073322 | A1* | 3/2016 | Gao ..................... | H04W 4/008 370/328 |
| 2016/0128116 | A1 | 5/2016 | Kim et al. | |
| 2016/0157056 | A1 | 6/2016 | Kim et al. | |
| 2017/0118637 | A1* | 4/2017 | Peng ..................... | H04W 12/04 |

OTHER PUBLICATIONS

3GPP TSG CT WG1, "LS on ProSe Functions reachability," 3GPP TSG WG4 Meeting #66, C4-141240, Jul. 2014, 2 pages.
HTC, "Evaluation and conclusion proposal for PC3 interface," SA WG2 Meeting #101, S2-140254, Jan. 2014, 6 pages.
3GPP TSG CT WG1, "LS on ProSe Functions reachability," SA WG2 Meeting #S2-104, S2-142286, Jul. 2014, 2 pages.
Qualcomm Incorporated et al., "Completetion of definitions," SA WG2 Meeting #S2-141411, SA WG2 Meeting #102, 14 pages.
International Search Report and Written Opinion issued in corresponding international No. PCT/EP2015/059332, dated Nov. 2, 2015, 16 pages (copy previously filed).
Office Action dated Jul. 1, 2016 in U.S. Appl. No. 14/441,361, 19 pages.
Korean Notice of Preliminary Rejection issued in Application No. 10-2017-7000431 dated Oct. 31, 2017, with English Translation, 6 pages.

* cited by examiner

OBTAINING AUTHORIZATION TO USE PROXIMITY SERVICES IN A MOBILE COMMUNICATION SYSTEM

CROSS-REFERENCE TO RELATED APPLICATIONS

This application is a 35 U.S.C. § 371 National Phase Entry Application from PCT/EP2015/059332, filed Apr. 29, 2015, and designating the United States, which claims priority to U.S. Provisional Application No. 62/018,561, filed Jun. 28, 2014. The above-identified applications are incorporated by reference in their entirety.

TECHNICAL FIELD

The present invention relates to mobile communication systems, and more particularly to technology that enables a User Equipment (UE) to obtain authorization to use Proximity-based Services.

BACKGROUND

The Third Generation Partnership Project (3GPP) produces standards that govern aspects of known mobile communications systems, such as the system known as Long Term Evolution (LTE). In Release 12 of technical specification TS 23.303, the 3GPP specifies functionality called Proximity-based Services (ProSe). This functionality includes methods that enable User Equipment (UE) to communicate directly with one another, UE to UE, by using a new radio channel (D2D—direct UE to UE radio channel for ProSe) based on LTE technology; i.e. communication between two or more UEs in proximity that are ProSe-enabled, by means of user plane transmission using Evolved Universal Terrestrial Radio Access (E-UTRA) technology via a path not traversing any network node.

Before a UE can start to use the ProSe services, the UE needs to reach ProSe Functions/Servers (PFs) in the LTE Evolved Packet Core (EPC) network in order to obtain authorization. This presents problems, as are described in the following.

PFs can be located in a number of places: There may be a PF in the home Network (NW), in the visited NW (if the UE is roaming), and in local NWs (i.e., in the vicinity of the UE). A local NW is an NW which is not the serving NW of the UE, and in whose radio resources the UE is authorized by the home NW to engage in so called ProSe Direct Discovery, which is a procedure employed by a ProSe-enabled UE to discover other ProSe-enabled UEs in its vicinity by using only the capabilities of the two UEs with E-UTRA technology.

The 3GPP specifies UE-to-PF-signalling over the user plane. In general, the UE is not aware of whether a Packet Data Network (PDN) Connection is home-routed or whether it is a Local Break-Out (LBO); that is, the routing of roaming traffic that is handled by a local operator without going back to the home NW. The signalling from user to NW through the Internetwork Packet Exchange (IPX) across NW borders requires tunnelling and extensive configuration and should be avoided. Also, setting up a new home-routed PDN connection should be avoided if possible. The reason is because of the limit on the number of PDN connections that can be set up (e.g., three connections in some NWs) and the limited number of bearers (up to eight).

SUMMARY

An object of the present invention is to solve, or at least mitigate, this problem in the art and to provide an improved method and device for authorizing a mobile terminal to use a proximity service.

This object is attained in a first aspect of the invention by a method performed by a home network proximity service function for authorizing a mobile terminal to use a proximity service, comprising receiving a request from the mobile terminal to obtain proximity service authorization in at least one other network, obtaining authorization information from a proximity service function of the at least one other network for which proximity service authorization is requested, and providing the mobile terminal with authorization information required for authorization with said at least one other network for which the request is made.

This object is attained in a second aspect of the invention by a home network proximity service function configured to authorize a mobile terminal to use a proximity service, which comprises a processing unit and a memory, said memory containing instructions executable by said processing unit, whereby said home network proximity service function is operative to receive a request from the mobile terminal to obtain proximity service authorization in at least one other network, obtain authorization information from a proximity service function of the at least one other network for which proximity service authorization is requested, and to provide the mobile terminal with authorization information required for authorization with said at least one other network for which the request is made.

This object is attained in a third aspect of the invention by a method performed by a visiting network proximity service function for authorizing a mobile terminal to use a proximity service, comprising receiving a request from the mobile terminal to obtain proximity service authorization in at least one other network, forwarding the request to a home network proximity service function, receiving, from the home network proximity service function, authorization information of the at least one other network for which proximity service authorization is requested, and providing the mobile terminal with the authorization information received from the home network proximity service function.

This object is attained in a fourth aspect of the invention by a visiting network proximity service function configured to authorize a mobile terminal to use a proximity service, which comprises a processing unit and a memory, said memory containing instructions executable by said processing unit, whereby said visiting network proximity service function is operative to receive a request from the mobile terminal to obtain proximity service authorization in at least one other network, forward the request to a home network proximity service function, receive, from the home network proximity service function, authorization information of the at least one other network for which proximity service authorization is requested, and provide the mobile terminal with the authorization information received from the home network proximity service function.

This object is attained in a fifth aspect of the invention by a method performed by a mobile terminal of requesting authorization to use a proximity service, comprising submitting a request to obtain proximity service authorization, receiving a response indicating to which proximity service function the authorization request should be submitted, submitting the proximity service authorization request to the proximity service function indicated in the response.

This object is attained in a sixth aspect of the invention by a mobile terminal configured to request authorization to use a proximity service, which comprises a processing unit and a memory, said memory containing instructions executable by said processing unit, whereby said mobile terminal is operative to submit a request to obtain proximity service authorization, receive a response indicating to which proximity service function the authorization request should be submitted, and submit the proximity service authorization request to the proximity service function indicated in the response.

This object is attained in a seventh aspect of the invention by a method performed by a Packet Data Network Gateway (PGW) of addressing proximity service functions, comprising receiving a request of a mobile terminal to obtain proximity service authorization, and submitting a response to the request indicating to which proximity service function the authorization request should be submitted.

This object is attained in an eight aspect of the invention by a Packet Data Network Gateway (PGW) configured to address proximity service functions, which comprises a processing unit and a memory, said memory containing instructions executable by said processing unit, whereby said PGW is operative to receive a request of a mobile terminal to obtain proximity service authorization, and submit a response to the request indicating to which proximity service function the authorization request should be submitted.

This object is attained in a ninth aspect of the invention by a method performed by a Mobility Management Entity (MME) of addressing proximity service functions, comprising receiving a request of a mobile terminal to obtain proximity service authorization, and submit a response to the request indicating to which proximity service function the authorization request should be submitted.

This object is attained in a tenth aspect of the invention by a Mobility Management Entity (MME) configured to address proximity service functions, which comprises a processing unit and a memory, said memory containing instructions executable by said processing unit, whereby said MME is operative to receive a request of a mobile terminal to obtain proximity service authorization, and submit a response to the request indicating to which proximity service function the authorization request should be submitted.

Further provided is computer programs causing devices to perform the methods according to the present invention, and computer program products comprising computer readable medium having the computer program embodied therein.

In conventional technology, issues exist with respect to PC3 signalling between a UE and a ProSe Function, when the ProSe Function and the UE reside in different networks. The authorization procedure as defined in the 3GPP TS 23.303 makes use of signalling over the PC3 interface towards a ProSe Function in the Home PLMN, in the Visited PLMN and in Local PLMNs. The PC3 signalling is carried over the user plane over the SGi interface, the SGi being the interface between the PGW and the PDN.

There are potential problems related to the PC3 signalling over the SGi interface involving e.g. e issues with availability and security. The Internet connection may not be available to UEs at all times. There may be unwillingness by operators to open the ProSe Functions for access via Internet, and related to that possible security attacks. If the PC3 signalling will be transported over an Internetwork Packet Exchange (IPX) network, the security issues may be addressed, but the traffic needs to be tunnelled in Generic Routing Encapsulation (GRE) tunnels, General Packet Radio Service Tunnelling Protocol (GTP) or Internet Protocol Security (IP Sec) tunnels.

In an aspect of the invention, a UE reaches the home ProSe Function by means of a home routed PDN connection. Thus, the UE connects an SGW via a S1-U interface and an H-PGW via S8 interface using IPX.

Hence, the UE requests ProSe authorization from the ProSe Function in the LPLMN via the HPLMN ProSe Function using interface PC6; as the UE resides in the HPLMN, no roaming is undertaken. Thereafter, the ProSe Function in HPLMN obtains authorization information from the ProSe Function in the LPLMN. Finally, the HPLMN ProSe Function provides authorization info to the UE by merging the authorization information from LPLMN with its own authorization information before providing the UE with the required ProSe authorization information.

Advantageously, the LPLMN is not directly addressed via PC3 but instead, signalling between the HPLMN and the LPLMN is done via the home ProSe Function over the PC6 interface. The IPX network need not tunnel network-to-network interface (NNI) signalling. Thereby, the problem of sending UE to ProSe server traffic requiring tunnelling through the IPX NW is advantageously eliminated.

Policy decisions for ProSe authorization may be negotiated between ProSe Functions in the Home, Visited and Local PLMNs; the UE reaches the home ProSe Function, the home ProSe Function signals towards the visited ProSe Function and the local ProSe Function(s) over PC6 and PC7. After the negotiation, the home ProSe Function provides the authorization to the UE via the H-PGW and the SGW.

In a further aspect of the invention, the UE reaches the visiting ProSe Function by means of an LBO PDN connection, i.e. the UE 100 is roaming. Thus, the UE connects to the SGW via the S1-U interface and the V-PGW via the S5 interface and further on to the VPLMN ProSe Function via PC3. The VPLMN ProSe Function forwards the UE request via PC7 to the home ProSe Function.

The HPLMN ProSe Function receives the UE request for ProSe authorization over the PC7 interface and obtains authorization information from the ProSe Function in the VPLMN via PC7 and authorization information from the ProSe Function in the LPLMN (if applicable) via the PC6 interface. Thereafter, the ProSe Function in HPLMN merges the authorization information from VPLMN and LPLMN with its own authorization information before providing the UE with the applicable ProSe authorization information via the VPLMN ProSe Function, the V-PGW and the SGW.

Again, the problem of sending UE to ProSe server traffic requiring tunnelling through the IPX NW, as is done in the art, is advantageously eliminated.

Preferred embodiments of the present invention will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1:
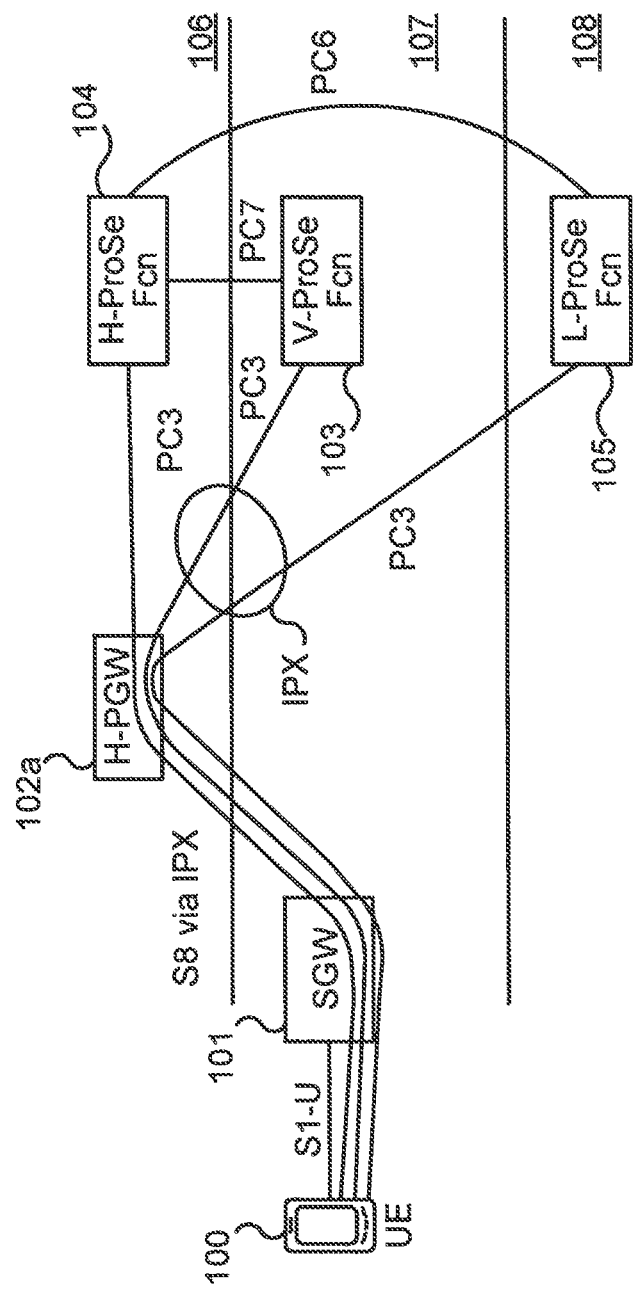
FIG. 1 shows a signalling diagram illustrating a first conceivable procedure for ProSe authorization.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances to facilitate identification of various steps and/or elements. However, the use of reference letters is not intended to impute or suggest that the so-referenced steps and/or elements are to be performed or operated in any particular order.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

Additional aspects of embodiments consistent with the invention will be appreciated from the following descriptive material. The following description is particularly oriented towards the 3GPP Release 12 version of requirements for the ProSe PC3 interface and possible ways of improvement. As such, the terminology used in the description will be well understood by those of ordinary skill in the art. However, it will be understood that this orientation towards 3GPP Release 12 is for purposes of illustration, and is not intended to limit the scope and applicability of the various technical aspects in any way, since such aspects are believed to be applicable in other contexts as well.

In conventional technology, issues exist with respect to PC3 signalling between a UE and a ProSe Function, when the ProSe Function and the UE reside in different networks. The authorization procedure as defined in the 3GPP TS 23.303 makes use of signalling over the PC3 interface towards a ProSe Function in the Home PLMN, in the Visited PLMN and in Local PLMNs. The PC3 signalling is carried over the user plane over the SGi interface, the SGi being the interface between the PGW and the PDN.

There are potential problems related to the PC3 signalling over the SGi interface:

If the PC3 signalling will be transported over the Internet, there may be issues with availability and security. The Internet connection may not be available to UEs at all times. There may be unwillingness by operators to open the ProSe Functions for access via Internet, and related to that possible security attacks.

If the PC3 signalling will be transported over an Inter-network Packet Exchange (IPX) network, the security issues may be addressed. On the other hand, there are requirements from Groupe Speciale Mobile Association (GSMA) as expressed in the IR.34 specification, whereby UE to Server traffic must not be transported directly over IPX but needs to be tunnelled in Generic Routing Encapsulation (GRE) tunnels, General Packet Radio Service Tunnelling Protocol (GTP) or Internet Protocol Security (IP Sec) tunnels.

The following looks at the requirements and discusses tentative solutions to the PC3 transport problem.

From the 3GPP specification TS 22.278, requirements from stage 1 are:

The HPLMN operator shall be able to authorize a ProSe-enabled UE to use ProSe Communication, separately for the HPLMN and for roaming in VPLMNs. This requirement applies to any ProSe E-UTRA Communication between two ProSe-enabled UEs, ProSe Group Communication, ProSe Broadcast Communication and ProSe-assisted Wireless Local Area Network (WLAN) direct communication.

The HPLMN operator shall be able to authorize the ability of a ProSe-enabled UE to use ProSe Communication to communicate with ProSe-enabled UEs served by a different PLMN. This requirement applies to any ProSe E-UTRA Communication between two ProSe-enabled UEs, ProSe Group Communication, ProSe Broadcast Communication and ProSe-assisted WLAN direct communication.

The VPLMN operator shall be able to turn on or off the ability for all the inbound roamers from a specific PLMN to use ProSe Communication. This requirement applies to any ProSe E-UTRA Communication between two ProSe-enabled UEs, ProSe Group Communication, ProSe Broadcast Communication and ProSe-assisted WLAN direct communication.

From the TS 23.303 specification, the following requirements are extracted:

the operator should be enabled to control the ProSe discovery feature in its network, and to authorize the functionality required for the ProSe discovery functions for each UE.

From the GSMA IR.34 and IR.88, it can be deducted that:

IPX requires that Server—Server traffic and UE to UE/Server traffic is routed separately and that UE to Server traffic is encapsulated in tunnelling.

The requirements require the HPLMN and the VPLMN to authorize the UE; however, for the Local PLMN, the ability for an operator to control discovery feature in its NW is only mentioned in the TS 23.303. This may apply to the Local NW; however, it is not required that the Local PLMN is able to communicate directly towards the UE for the authorization.

A first conceivable procedure for ProSe authorization is illustrated in the signal flow diagram depicted in FIG. 1. This embodiment uses IPX and home routed PDN connection, i.e. the session is established via the home PGW (H-PGW) 102a of the UE 100. In order to meet the requirement on tunnelling through the IPX network, the H-PGW 102a shall set up a GRE tunnel and if required an IP Sec tunnel through the IPX towards the ProSe Function 103, 105 in the VPLMN 107 and the LPLMN 108, respectively. The H-PGW 102a may filter out PC3 traffic towards each ProSe Function 103, 105 in the VPLMN 107 or LPLMN 108. The H-PGW 102a may then set up tunnels towards the respective ProSe Function 103, 105 via the PC3 interfaces. This would require agreements between the operators such that the ProSe Function 103, 105 in each PLMN (local 107 or visited 108) is known by the H-PGW 102a. In particular, if the PC3 is home routed, it may be possible to configure this in the H-PGW 102a since there must be roaming agreements between the operators for the use of PC6 and PC7 interfaces between the ProSe Functions 103, 105 in VPLMN 107 and LPLMN 108. The required authorization information to be provided to the UE 100 is collected by the H-PGW 102a from the respective ProSe Function 103, 104, 105 over the PC3 interface and submitted to the UE 100 via the SGW 101.

This procedure requires that each PGW for the roaming partners is configured with IP-addresses for ProSe Functions, and every time any roaming partner adds or removes a server, all PGWs in the networks are re-configured. It is not practically scalable, unless ProSe is only used between more than a few operators.

Figure 2:
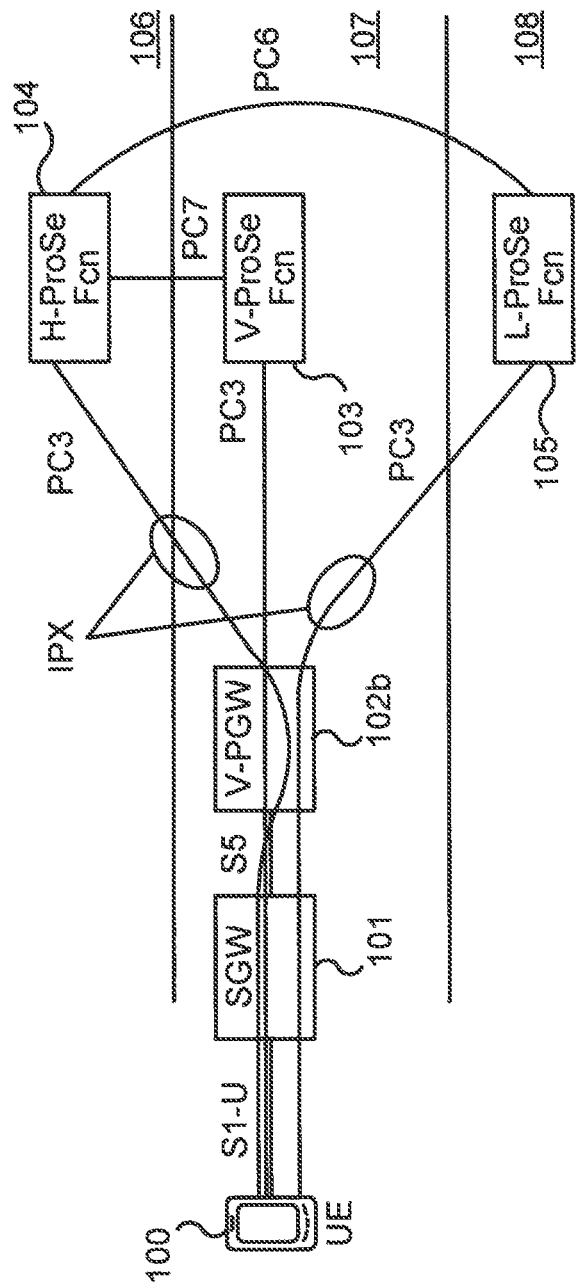
FIG. 2 shows a signalling diagram illustrating a second conceivable procedure for ProSe authorization.

A second conceivable procedure for ProSe authorization is illustrated in the signal flow diagram depicted in FIG. 2. This option uses IPX and LBO routed PDN connection. It is basically the same solution as discussed with reference to FIG. 1, but the configuration may be even more problematic in this scenario. In a commercial setting, the VPLMN 107 and the LPLMNs 108 may very well not have roaming relations. The required authorization information to be provided to the UE 100 is collected by the V-PGW 102b from the respective ProSe Function over the PC3 interface and submitted to the UE 100 via the SGW 101.

Figure 3:
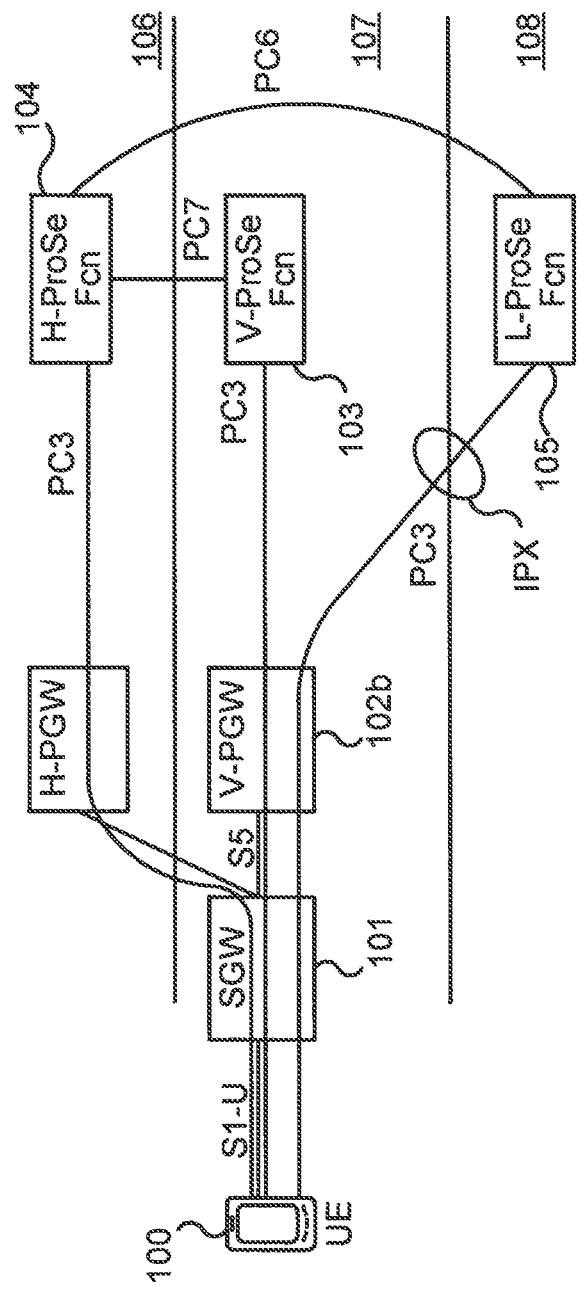
FIG. 3 shows a signalling diagram illustrating a third conceivable procedure for ProSe authorization.

A third conceivable procedure for ProSe authorization is illustrated in the signal flow diagram depicted in FIG. 3. This option uses IPX and two PDN connections, one LBO routed PDN Connection via the V-PGW 102b and one home routed PDN connection via the H-PGW 102a. It is basically the same solution as discussed above with reference to FIG. 1, but using two PDN Connections, without any obvious benefits. Reaching the ProSe Function 105 in the LPLMN 108 is still problematic. There is no information supplied to the UE 100 indicating whether a PDN connection is home routed or using a local break-out. The UE 100 has two PDN connections, but the UE 100 is unaware of which one to use for signalling towards each ProSe Function. The required authorization information to be provided to the UE 100 is collected on the one hand by the V-PGW 102b from the respective ProSe Function 103, 105 in the VPLMN 107 and LPLMN 108 over the PC3 interface and submitted to the UE 100 via the SGW 101, and on the other hand by the H-PGW 102a from the ProSe Function 104 in the HPLMN 106 over the PC3 interface and submitted to the UE 100 via the SGW 101.

In a fourth conceivable procedure for ProSe authorization, the ProSe Function is reached by signalling over the Internet. The Internet connection may be protected by IP Sec tunnelling from the UE to the ProSe Functions. This embodiment may not always be feasible due to uncertain availability and quality of service of the connection.

In a fifth conceivable procedure for ProSe authorization, different solutions for commercial and for public safety scenarios are used. For commercial use cases, lower security provided by an Internet connection may be acceptable, while for the public safety use cases, the higher security of a protected (possibly IPX) NW may be provided. In the public safety case, there may be less of a configuration problem than for the commercial uses. Public safety solutions may be operating within country borders. Other options for the public safety operations may be to use separate APNs.

Figure 4:
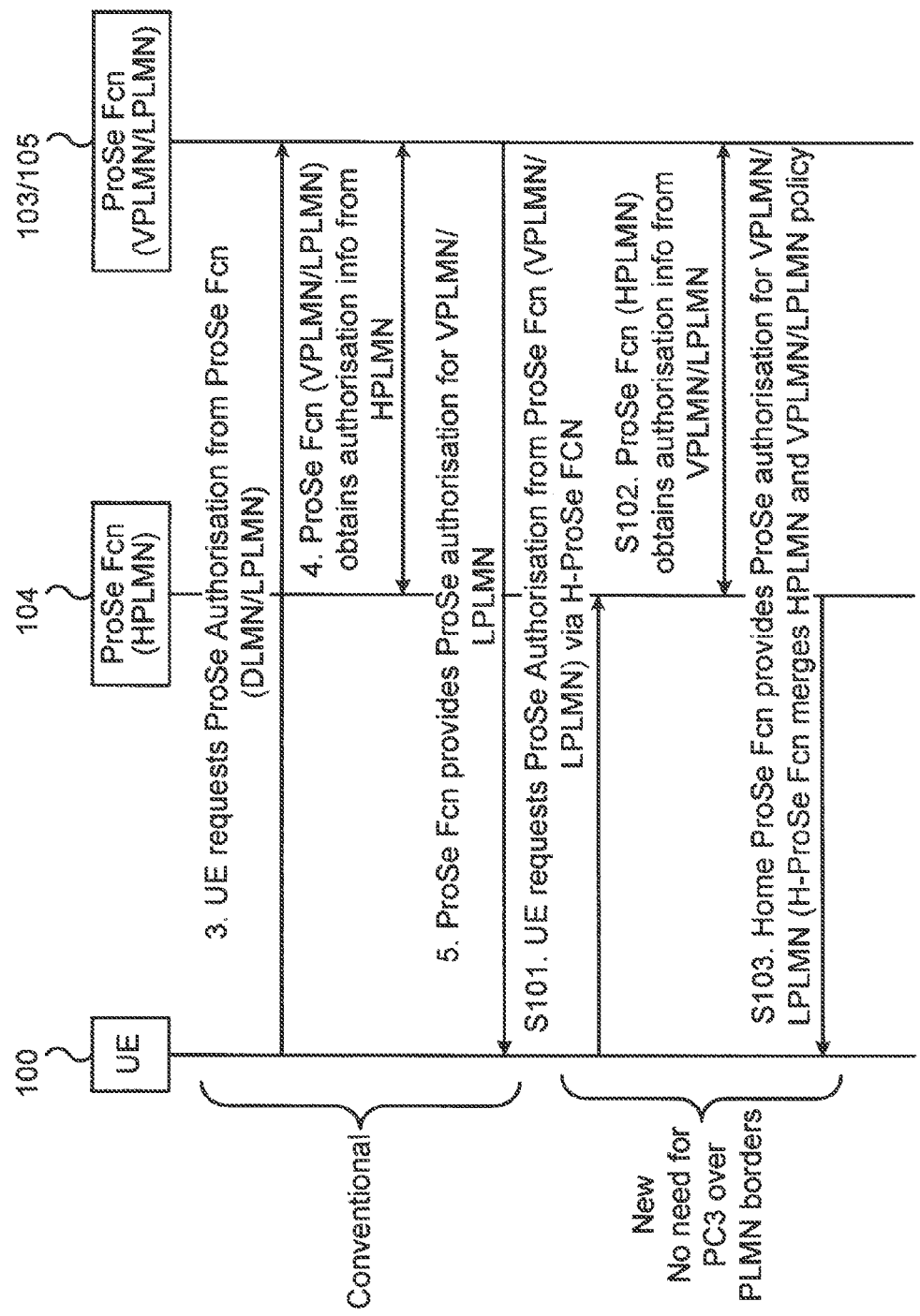
FIG. 4 shows a signalling diagram that compares conventional procedures with new procedures described herein.

FIG. 4 shows a signalling diagram that compares conventional procedures with new procedures described herein. In the prior art procedure shown in the upper three steps of FIG. 4, the UE 100 initially requests ProSe authorization from the ProSe Function 103, 105 in the VPLMN 107 or LPLMN 108 in order to receive authorization info applicable to the present PLMN. Thereafter, the ProSe Function 103, 105 in VPLMN 107 or LPLMN 108 obtains authorization info from ProSe Function 104 of the HPLMN 106 and merges with own authorization policy. Finally, the ProSe Function 103, 105 in VPLMN 107 or LPLMN 108 provides authorisation info to the UE 100.

The lower three steps of FIG. 4 illustrates an embodiment of the method for ProSe authorization of the UE 100 according to the invention. In step S101, the UE 100 requests ProSe authorization from the ProSe Function 103, 105 in the VPLMN 107 or LPLMN 108 via the ProSe Function 104 in the HPLMN 106, in order to receive authorization info applicable to the VPLMN/LPLMN 107/108. Thereafter, in step S102, the ProSe Function 104 in HPLMN 106 obtains authorization info from the ProSe Function 103, 105 in VPLMN 107 or LPLMN 108 (or both, if applicable). Finally, in step S103, the ProSe Function 104 of the HPLMN 106 provides authorization info to the UE 100. Hence, the HPLMN ProSe Function 104 merges the authorization info from VPLMN/LPLMN 107/108 with its own authorization policy before providing the UE 100 with the applicable VPLMN/LPLMN authorization information.

The LPLMN 108 is a PLMN close to a current position of the requesting UE 100, where another UE may be registered, i.e. another UE with which the UE 100 requesting authorization may want to communicate or discover.

Thus, as will be described in the following, if the UE 100 already resides in the HPLMN 106, no authorization is obtained from VPLMN 107, but there is a LPLMN 108 from which the authorization information is obtained. This is referred to as a home routed connection, and the UE 100 request is received at the HPLMN ProSe Function 104 via a home PGW 102a.

If the UE 100 is roaming, authorization information is obtained from a VPLMN 107, and there may well be a LPLMN 108 from which the authorization information is further obtained. This is referred to as a local break-out (LBO) connection and the UE request is received at the HPLMN ProSe Function 104 via a VPLMN ProSe Function 103.

Figure 5:
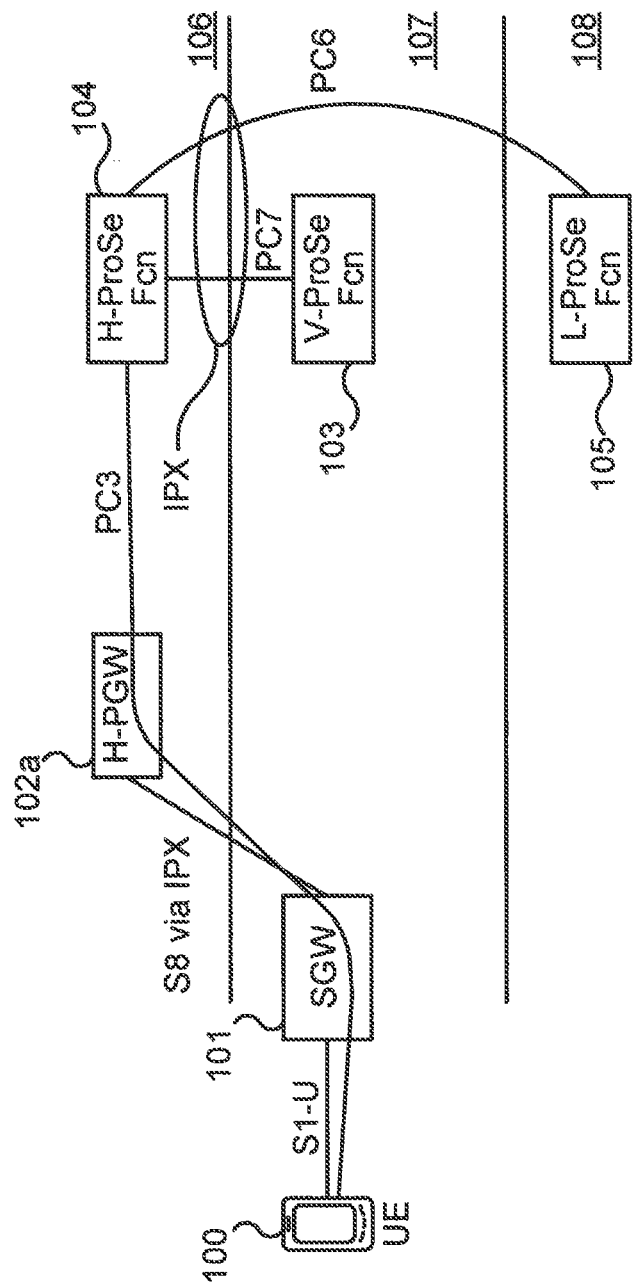
FIG. 5 shows a signal routing diagram illustrating a routing possibility for a UE obtaining ProSe authorization according to an embodiment of the invention.

FIG. 5 shows a signal routing diagram illustrating a routing possibility for a UE 100 obtaining ProSe authorization according to an embodiment of the invention. The new procedure involves changing the signalling procedure for authorization compared to conventional technology. FIG. 5 illustrates the UE 100 reaching the home ProSe Function 104, i.e. the ProSe Function 104 in the HPLMN 106, by means of a home routed PDN connection. Thus, the UE 100 connects to the SGW 101 via the S1-U interface and the H-PGW 102a via the S8 interface using IPX.

Hence, the UE 100 requests ProSe authorization from the ProSe Function 105 in the LPLMN 108 via the HPLMN ProSe Function 104 using interface PC6; as the UE 100 resides in the HPLMN 106, no roaming is undertaken. Thereafter, the ProSe Function 104 in HPLMN 106 obtains authorization information from the ProSe Function 105 in the LPLMN 108. Finally, the HPLMN ProSe Function 104 provides authorization info to the UE 100 by merging the authorization information from LPLMN 108 with its own authorization information before providing the UE 100 with the required ProSe authorization information.

Advantageously, the LPLMN 108 is not directly addressed via PC3 but instead, signalling between the HPLMN 106 and the LPLMN 108 is done via the home ProSe Function 104, typically embodied by a server, over the PC6 interface. The IPX network need not tunnel network-to-network interface (NNI) signalling. Thereby, the problem of sending UE to ProSe server traffic requiring tunnelling through the IPX NW is advantageously eliminated. These procedures require changing the existing 3GPP agreed upon procedure.

Policy decisions for ProSe authorization may be negotiated between ProSe Functions 104, 103, 105 in the Home, Visited and Local PLMNs 106, 107, 108 as previously shown in FIG. 4. The UE 100 reaches the home ProSe Function 104. The home ProSe Function 104 signals towards the visited ProSe Function 103 and the local ProSe Function(s) 105 over PC6 and PC7. After the negotiation, the home ProSe Function 104 provides the authorization to the UE 100 via the H-PGW 102a and the SGW 101.

Figure 6:
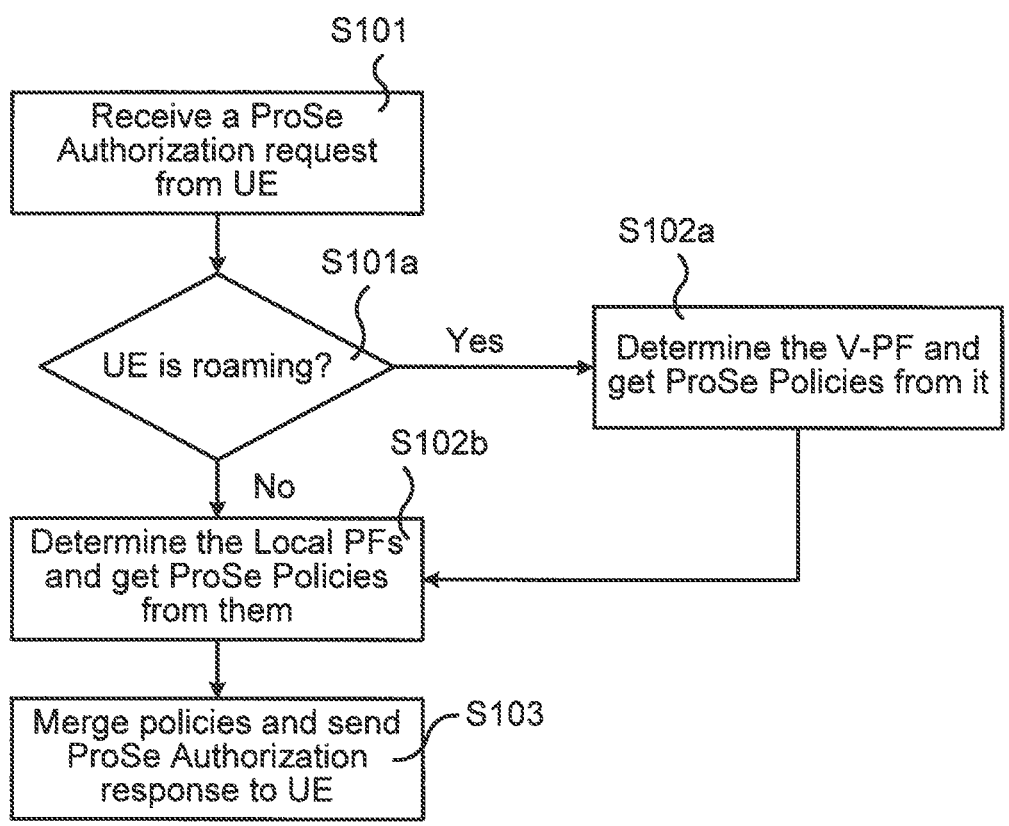
FIG. 6 illustrates a flowchart of a ProSe authorization process carried out by a home ProSe Function according to an embodiment of the present invention.

FIG. 6 illustrates a flowchart of a ProSe authorization process carried out by the home ProSe Function 104 according to an embodiment of the present invention. In step S101, the ProSe Function 104 in the HPLMN 106 receives a UE request for ProSe authorization. Then, in step S101a, the HPLMN ProSe Function 104 determines whether the UE 100 is roaming or not. If that is the case, the HPLMN ProSe Function 104 obtains in step S102a the required authorisation information from the VPLMN ProSe Function 103. Then, it proceeds to step S102b and obtains the required authorisation information from the VPLMN ProSe Function 105 (if applicable; otherwise step S102b is omitted). Finally, in step S103, the HPLMN ProSe Function 104 merges the authorization information from the ProSe Functions 103, 105 of the VPLMN 107 and LPLMN 108 with its own authorization information before providing the UE 100 with the merged authorization information.

If the HPLMN ProSe Function 104 determines in step S101a that the UE 100 is not roaming, i.e. the UE 100 does not reside in a VPLMN 107, the HPLMN ProSe Function 104 proceeds to step S102b and obtains the required authorisation information from the VPLMN ProSe Function 103. Finally, in step S103, the HPLMN ProSe Function 104 merges the authorization information from the LPLMN ProSe Function 105 with its own authorization information before providing the UE 100 with the merged authorization information.

Figure 7:
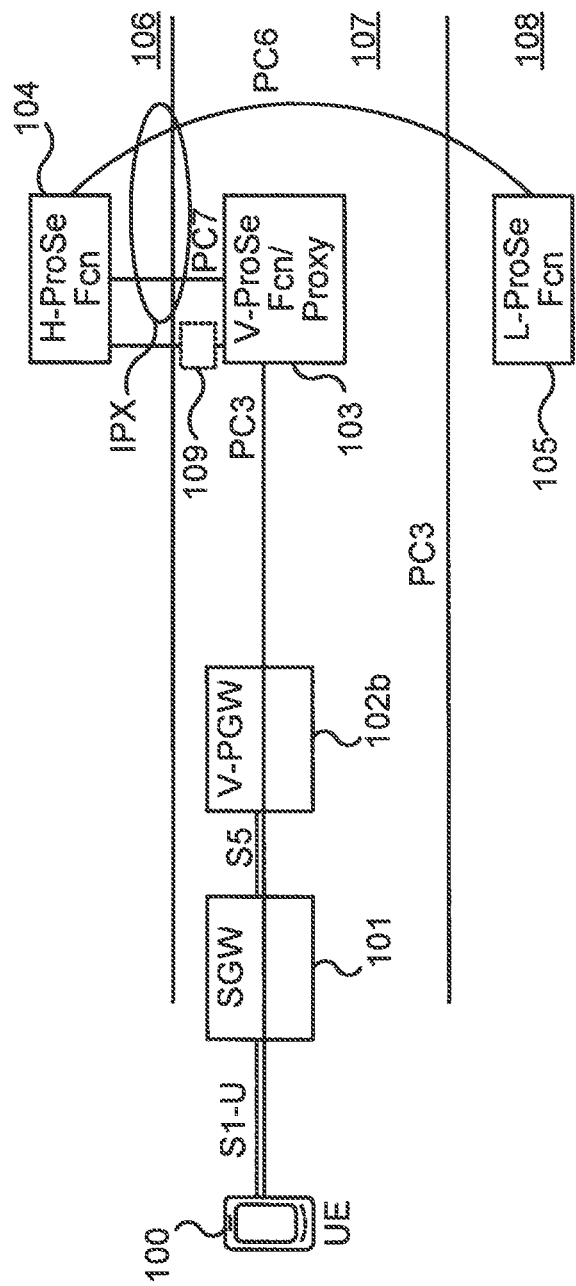
FIG. 7 shows a signal routing diagram illustrating a routing possibility for a UE obtaining ProSe authorization according to a further embodiment of the invention.

FIG. 7 shows a signal routing diagram illustrating a routing possibility for a UE 100 obtaining ProSe authorization according to a further embodiment of the invention. The new procedure involves changing the signalling procedure for authorization compared to conventional technology. FIG. 7 illustrates the UE 100 reaching the visiting ProSe Function 103, i.e. the ProSe Function 103 in the VPLMN 107, by means of an LBO PDN connection, i.e. the UE 100 is roaming. Thus, the UE 100 connects to the SGW 101 via the S1-U interface and the V-PGW 102b via the S5 interface and further on to the VPLMN ProSe Function 103 via PC3. The VPLMN ProSe Function 103 forwards the UE 100 request via PC7 to the home ProSe Function 104.

In an embodiment of the invention, the VPLMN ProSe Function 103 forwards the UE request via a ProSe Proxy 109, as will be discussed later. However, from a functional point of view, the visiting ProSe Function 103 and the proxy 109 can be regarded as being combined in a single network element.

The HPLMN ProSe Function 104 receives the UE request for ProSe authorization over the PC7 interface and obtains authorization information from the ProSe Function 105 in the VPLMN 108 via PC7 and authorization information from the ProSe Function 105 in the LPLMN 108 (if applicable) via the PC6 interface. Thereafter, the ProSe Function 104 in HPLMN 106 merges the authorization information from VPLMN 107 and LPLMN 108 with its own authorization information before providing the UE 100 with the applicable ProSe authorization information via the VPLMN ProSe Function 103, the V-PGW 102b and the SGW 101.

Again, the problem of sending UE to ProSe server traffic requiring tunnelling through the IPX NW, as is done in the art, is advantageously eliminated.

Figure 8:
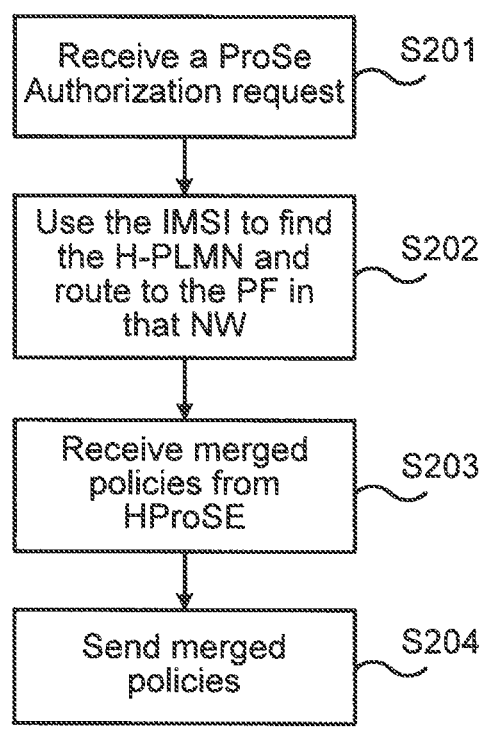
FIG. 8 illustrates a flowchart of a ProSe authorization process carried out by a visiting ProSe Function according to an embodiment of the present invention.

FIG. 8 illustrates a flowchart of a ProSe authorization process carried out by the visiting ProSe Function 103 according to an embodiment of the present invention. In step S201, the ProSe Function 103 in the VPLMN 107 receives a UE request for ProSe authorization. Thereafter, in step S202, the VPLMN ProSe Function 103 forwards the request to the HPLMN ProSe Function 104 over the PC7 interface, whereby the HPLMN ProSe Function 103 obtains the required authorization information via PC6 and PC7. Thereafter, as previously has been discussed, the ProSe Function 103 in HPLMN 106 merges the authorization information from VPLMN 107 and LPLMN 108 with its own authorization information before providing the VPLMN ProSe Function 103 with the required ProSe authorization information in step S203. Finally, the VPLMN ProSe Function 103 submits the merged authorization information to the requesting UE 100 in step S204.

As illustrated in the signal routing diagrams of FIGS. 5 and 7, respectively, the UE 100 may use any PDN connection for ProSe signalling and the UE 100 may not be aware if the PDN connection is home routed or a LBO connection. Therefore, it is required that both the home routed and the LBO PDN connections can be used. Reaching the home ProSe Function 104 via a home routed PDN connection presents no problem. However, if the LBO is used, a ProSe Function 103 in the visited NW 107 may provide a proxy function (as mentioned with reference to FIG. 7) for routing of ProSe authorization messages to/from the home ProSe Function 104.

The visiting ProSe Function 103 (and the proxy 109) is in the same NW as the V-PGW 102b to avoid tunnelling and configuration problems.

A visited operator that supports ProSe in its network should support the proxy function in the ProSe Function. A visited operator not supporting ProSe may not implement the ProSe proxy; however, it is unlikely that the ProSe UE will get ProSe service in this visited NW. Even such an unlikely use case may be supported by, for example, a specific ProSe APN in the HPLMN.

A VPLMN operator supporting ProSe functionality includes a new functionality in the form of a Proxy ProSe Function (PF) on the SGi interface (defined, for example, by 3GPP standards), such that the UE can reach the home ProSe Function through this proxy. Thus, in an embodiment, the VPLMN ProSe Function 103 communicates with the HPLMN ProSe Function 104 via a VPLMN ProSe proxy 109. The proxy 109 is connected to the VPLMN ProSe Function 103, either as a separate element, or integrated with the VPLMN ProSe Function 103.

It should be noted that in case no response is received by the visiting ProSe Function 103 from the home ProSe Function 104 in step S203 due to e.g. an error in communication path PC7, it cannot provide the UE 100 with the requested authorization information. Therefore, the UE 100 may need to implement a timer for re-transmission of the authorization in case it does not receive a response within the time limit stipulated by the timer.

Figure 9:
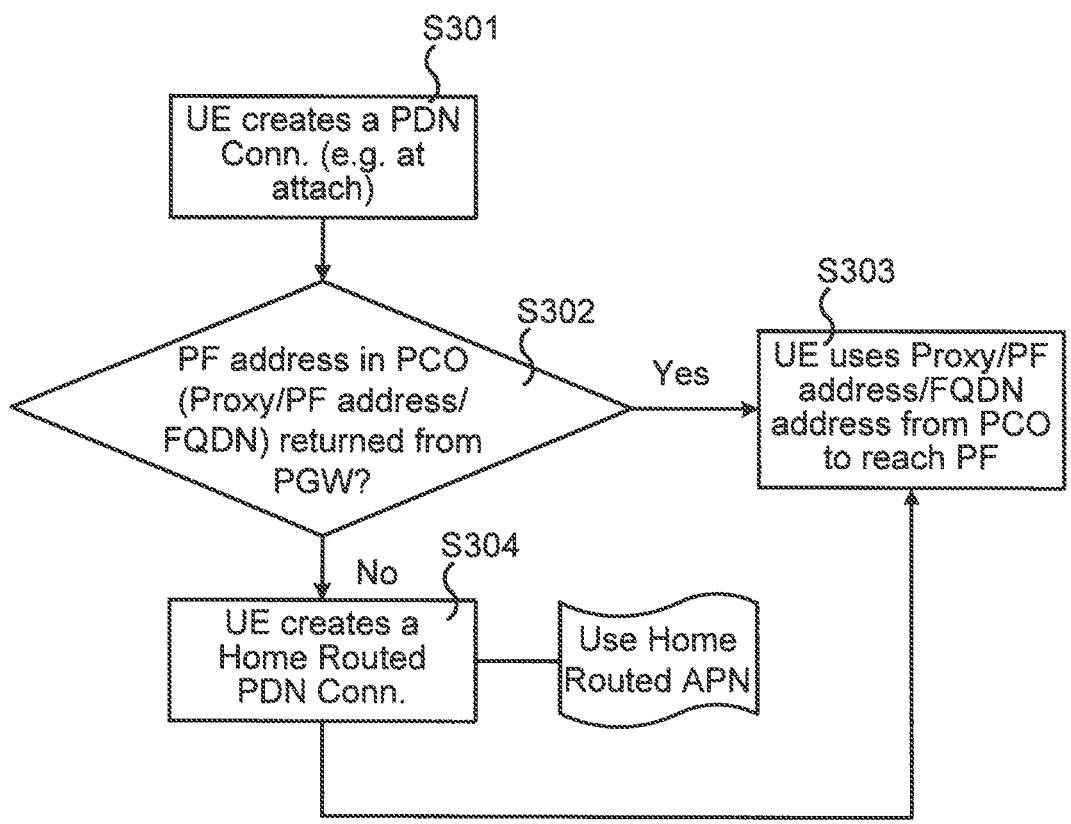
FIG. 9 illustrates a flowchart of UE signalling for requesting ProSe authorization according to an embodiment of the present invention.

FIG. 9 illustrates a flowchart of UE signalling for requesting ProSe authorization according to an embodiment of the present invention. In a first step S310, the UE 100 makes a request to a PGW 102a/102b to establish a PDN connection for accessing the applicable ProSe Function 104, 103 in the HPLMN 106 for a home routed connection, or in the VPLMN 107 for an LBO connection. It should be noted that the UE 100 may not know whether a PDN connection is home routed or an LBO, but a Home Subscriber Server (HSS) can provide info to a Mobility Management Entity (MME) for PGW selection (as described for instance in TS 23.401) whether the allocation of a PGW from the visited PLMN is allowed or whether a PGW from the home PLMN shall be allocated.

The PGW 102a/102b returns a VPLMN ProSe Function or ProSe proxy destination address (if applicable) in step S302 in a Protocol Configuration Options (PCO) field in its response to the requesting UE 100. The destination address may be embodied e.g. in the form of an Internet Protocol (IP) address or an FQDN that the UE uses for a Domain Name System (DNS) server look-up to obtain the actual address.

The PCO field is thus used to return a new parameter, the ProSe Function/proxy address, to the UE 100. A VPLMN 107 thus returns the ProSe Function/proxy address while a HPLMN 106 returns the home ProSe Function address (or a Fully Qualified Domain Name (FQDN) resolvable to the ProSe Function address) in the PCO field at establishment of a PDN connection. The UE 100 contacts the indicated ProSe Function for authorization.

Hence, if the PGW in step S302 returns a VPLMN ProSe Function/proxy address, i.e. the PGW is the V-PGW 1002b, the UE 100 turns to the VPLMN ProSe Function/proxy 103/109 for authorization in step S303 as previously has been discussed in detail with reference to FIG. 7.

Otherwise, a home routed PDN connection is set up in step S304, wherein the UE 100 turns to the HPLMN ProSe Function 104 for authorization in step S303 as previously has been discussed in detail with reference to FIG. 5. As can be deducted from FIG. 9 (and in FIGS. 5 and 7), UE signalling for ProSe Authorization shall advantageously always go to the ProSe Function 104 in the home NW 106. The home ProSe Function 104 will then negotiate with the ProSe Function/proxy 103/109 in the visiting NW 107 and with the ProSe Function(s) 105 in the Local NW(s) 108.

Since the UE 100 is ProSe-enabled, it can be assumed that the HPLMN 106 has implemented ProSe. The only case when there is no ProSe Function/proxy address or FQDN in the PCO field is thus in the LBO scenario when the VPLMN 107 has not implemented ProSe functionality, in which case a home routed PDN connection is set up and used for authorization.

For efficiency, the UE 100 should preferably first try to use the PDN connection that it already has established (which may be LBO), and then set up one or further PDN connection(s) towards the HPLMN 106 only in exceptional cases.

As illustrated in FIG. 9, UE signalling shall go to a ProSe Function 104 in the HPLMN 106. A visited NW 107 supporting ProSe shall in an embodiment implement a ProSe proxy 109. Any NW (home 106 or visited 107) that supports ProSe shall preferably include a ProSe Function (or proxy) address in the PCO for a new PDN Connection. The home NW 106 includes the ProSe Function address, while the visited NW 107 provides the ProSe Function/proxy address. The UE 100 will use the address (proxy/ProSe Function/FQDN) if included, or otherwise set up a new PDN connection to HPLMN 106 to a preconfigured APN, which is configured to always be home routed.

Figure 10:
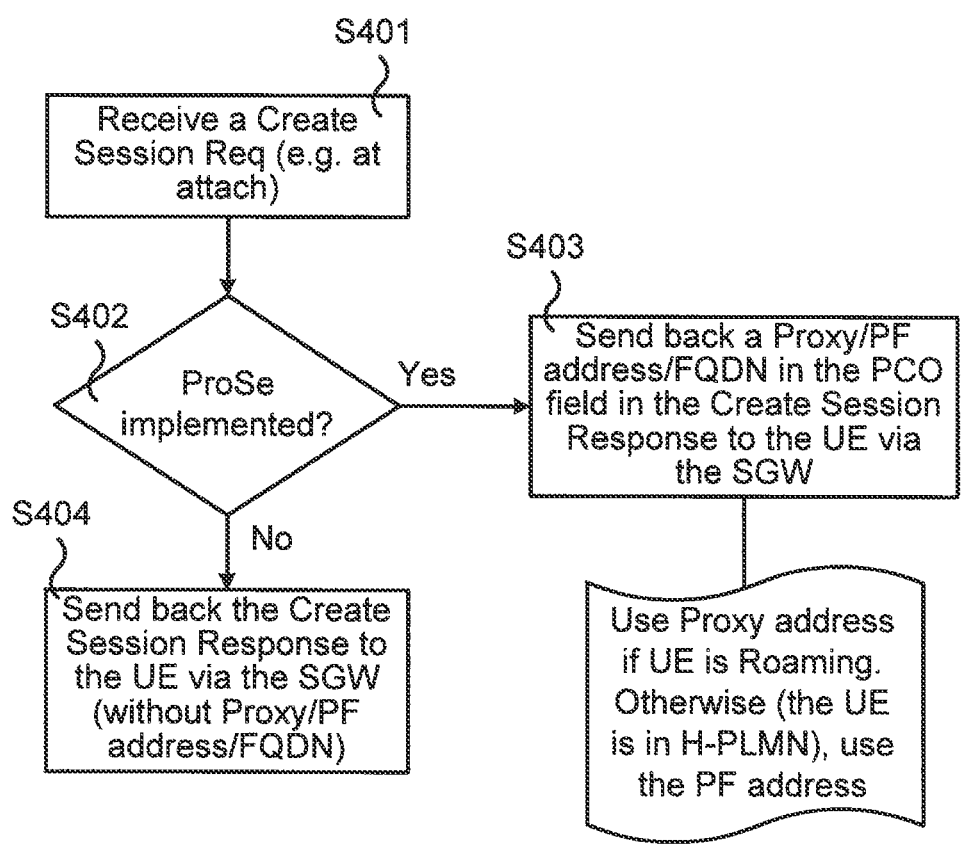
FIG. 10 illustrates a flowchart of a PGW managing UE signalling for requesting ProSe authorization according to an embodiment of the present invention.

FIG. 10 illustrates a flowchart of PGW 102a/102b managing UE signalling for requesting ProSe authorization according to an embodiment of the present invention. In a first step S410, the PGW 102a/102b receives a request to create a session (e.g. at attach).

If it is determined in step S402 that the PGW 102a/102b indeed is ProSe-enabled, the PGW 102a/102b returns a VPLMN ProSe Function or ProSe proxy destination address (in case of a V-PGW 102b), or a HPLMN ProSe destination address (in case of an H-PGW 102a) in step S403 in the PCO field in its response via the SGW 101 to the requesting UE 100. Thus, if the UE 100 is roaming it will be directed to the VPLMN ProSe Function/proxy 103/109 and if not, the UE 100 is directed to the HPLMN ProSe Function 104 for authorization.

If it is determined in step S402 that the PGW 1002a/102b is not ProSe-enabled, the PGW 102a/102b returns a response accordingly in step 404, wherein a home routed PDN connection subsequently will be set up, and the UE 100 will turn to the HPLMN ProSe Function 104 for authorization as previously has been discussed in detail with reference to FIG. 5.

Figure 11:
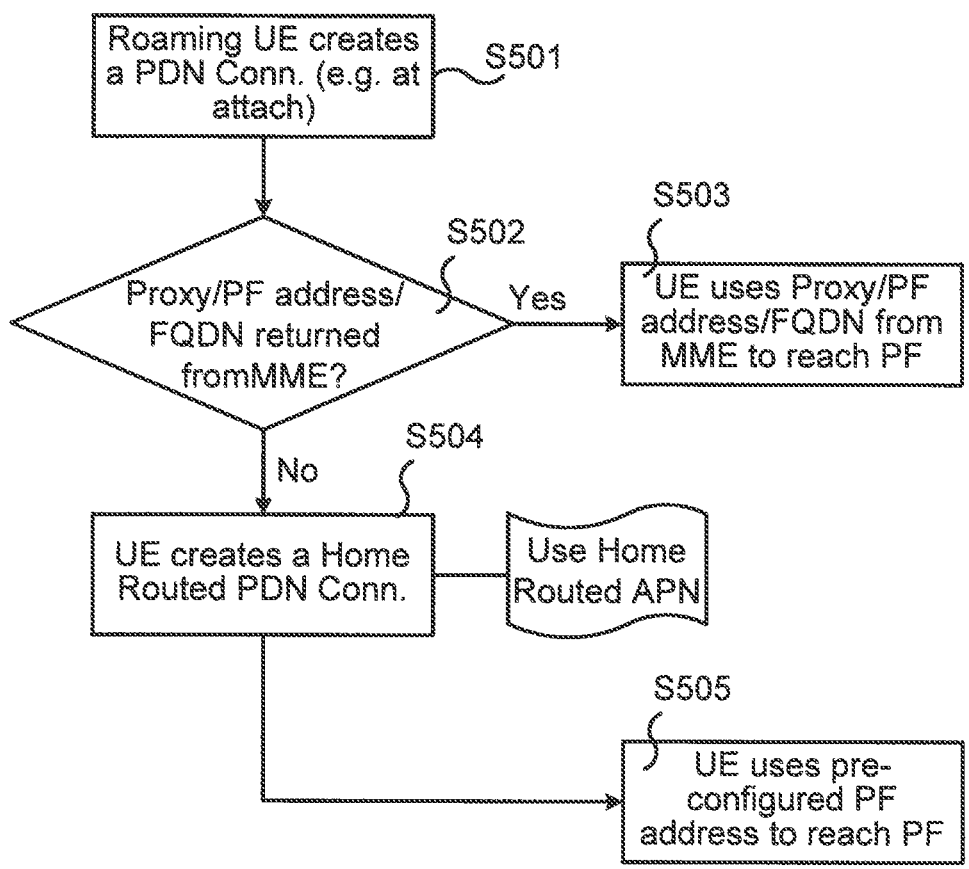
FIG. 11 illustrates a flowchart of UE signalling for requesting ProSe authorization according to an alternative embodiment of the present invention.

FIG. 11 illustrates a flowchart of UE signalling for requesting ProSe authorization according to an alternative embodiment of the present invention. In a first step S501, a roaming UE 100 makes a request to a Mobility Management Entity (MME) to establish a PDN connection for accessing the ProSe Function 103 in the VPLMN 107. It should be noted that the UE 100 may not know whether a PDN connection is home routed or an LBO.

The MME (not shown) returns a VPLMN ProSe Function or ProSe proxy no destination (if applicable) in step S502 in its response to the requesting UE 100, if it has access to such a destination address. Hence, if the MME in step S502 returns a VPLMN ProSe Function/proxy address, the UE turns to the VPLMN ProSe Function/proxy for authorization in step S503 as previously has been discussed in detail with reference to FIG. 7.

Otherwise, a home routed PDN connection is set up in step S504, wherein the UE turns to the HPLMN ProSe Function 104 in step S505 using a preconfigured address to the ProSe Function 104 in the home NW 106. The home ProSe Function will then negotiate with the ProSe Function/proxy 103/109 in the visiting NW 107 and with the ProSe Function(s) 105 in the Local NW(s) 108 as previously discussed.

It can be seen that aspects of embodiments of the invention involve the following changes to conventional procedures/technology:

- removal of the direct UE-to-Local ProSe Function signalling as is conventionally known from Release 12 of specification TS 23.303;
- communication between the home ProSe Function to visiting ProSe Function and local ProSe Function over the PC6 and PC7 interfaces;
- using a UE-to-server communication to the home ProSe Function via a home routed PDN connection or via local break-out if there is a Proxy ProSe Function in the VPLMN.

Figure 12:
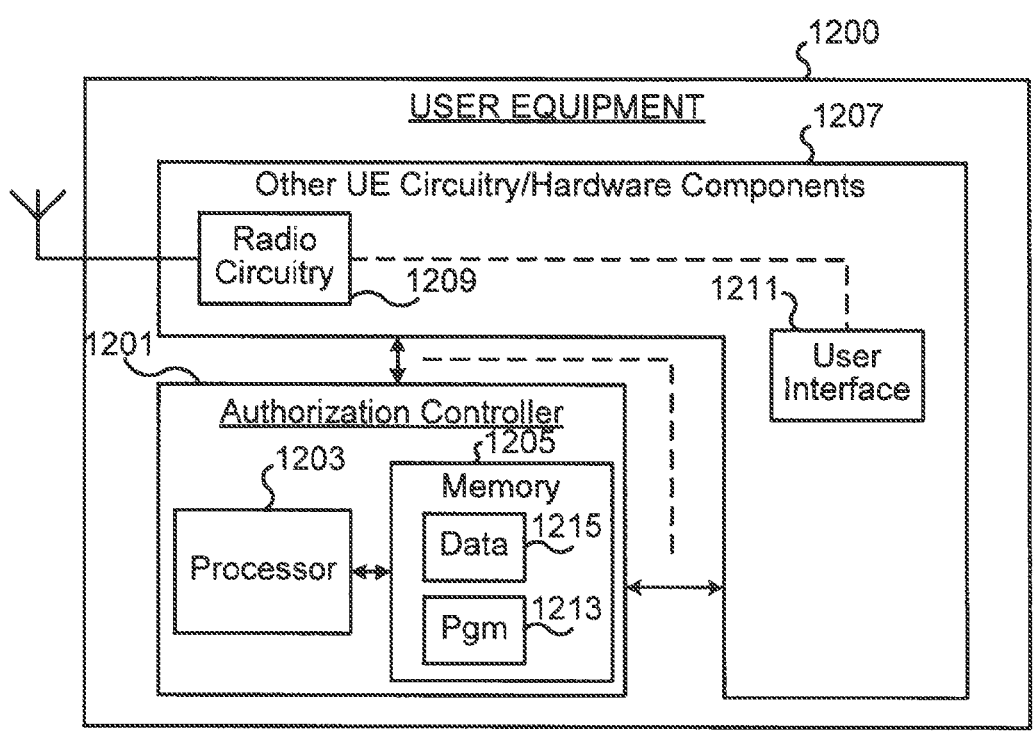
FIG. 12 illustrates a UE according to an embodiment of the present invention.

FIG. 12 is a block diagram of an exemplary UE 1200 in accordance with embodiments consistent with the invention. This is a processor-implemented embodiment, but alternative embodiments may use hardwired elements or a combination of both. The UE 1200 comprises an authorization controller 1201 that includes a processor 1203 (e.g., one or more of a Central Processing Unit (CPU), dedicated circuitry and/or a software module), a memory 1205 and other circuitry/hardware 1207 as would be found in a conventional UE, such as radio circuitry 1209 and a user interface 1211. The memory 1205 stores a program ("Pgm") 1213 that, when executed by the processor 1203, causes the processor to carry out various aspects of embodiments as described above. The memory 1205 can also store data 1215 that is used and/or generated as part of this functionality.

Figure 13:
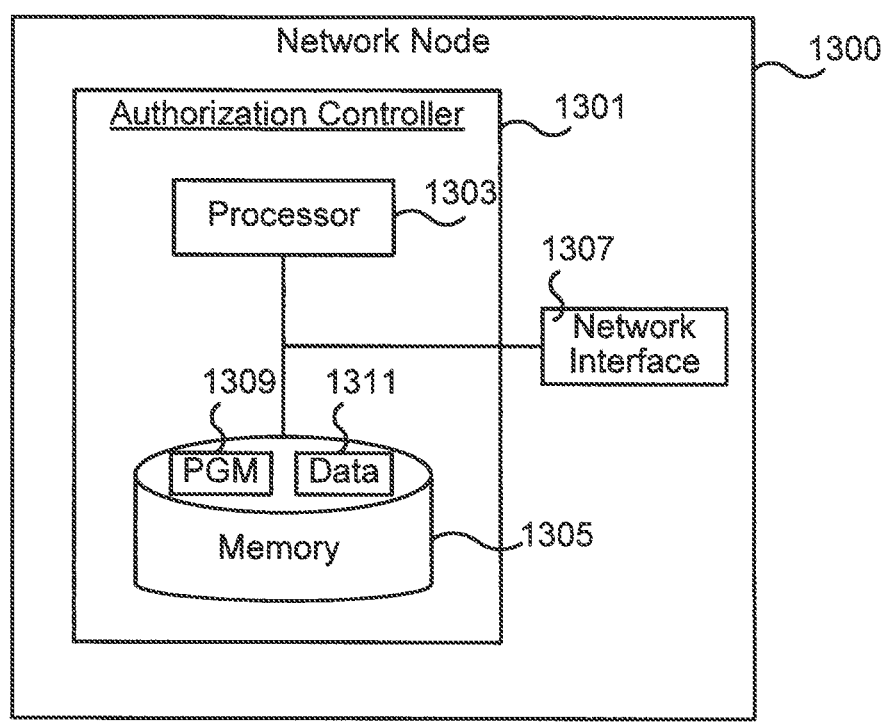
FIG. 13 illustrates a network node according to an embodiment of the present invention.

FIG. 13 is a block diagram of an exemplary network node 1300 in accordance with various embodiments consistent with the invention. This is a processor-implemented embodiment, but alternative embodiments may use hardwired elements or a combination of both. The network node 1300 comprises an authorization controller 1301 that includes a processor 1303 (e.g., one or more of a Central Processing Unit (CPU), dedicated circuitry and/or a software module), and a memory 1305. The network node 1300 includes other circuitry/hardware as would be found in a conventional network node, such as network interface 1307.

The memory 1305 stores a program ("Pgm") 1309 that, when executed by the processor 1303, causes the processor to carry out various aspects of embodiments as described above. The memory 1305 can also store data 1311 that is used and/or generated as part of this functionality.

The various aspects of technology in accordance with the invention provide improvements over existing technology. For example:

- The ProSe Authorization is improved such that the user-to-NW signaling through the IPX across NW borders, which requires tunneling and extensive configuration, is avoided.
- Except in rare cases, ProSe authorization is made possible without setting up a home routed PDN connection.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way.

The invention claimed is:

1. A method for authorizing a mobile terminal to use a proximity service, wherein the mobile terminal has a home network, comprising:
    a first proximity service function receiving, a request transmitted by the mobile terminal, wherein the first proximity service function resides in the mobile terminal's home network and the request is a request for obtaining proximity service authorization for at least a second network that is not the mobile terminal's home network;
    in response to the request transmitted by the mobile terminal, the first proximity service function, which resides in the mobile terminal's home network, obtaining proximity service authorization information from a second proximity service function residing in the second network; and
    after obtaining the proximity service authorization from the second proximity service function, the first proximity service function, which resides in the mobile terminal's home network, providing to the mobile terminal information required for authorization with said second network for which the request is made.

2. The method according to claim 1, wherein providing to the mobile terminal the information required for authorization with said second network comprises:
    merging authorization information of the home network with the obtained proximity service authorization information and providing the merged authorization information to the mobile terminal.

3. The method according to claim 2, further comprising:
    determining whether the mobile terminal is roaming; and
    in response to determining that the mobile terminal is roaming, obtaining authorization information from a proximity service function of a visiting network for which proximity service authorization is requested, and providing the mobile terminal with the merged authorization information of the home network and the visiting network.

4. The method according to claim 3, further comprising:
    obtaining authorization information from a proximity service function of a local network for which proximity service authorization is requested, and providing the mobile terminal with the merged authorization information of the home network, the visiting network and the local network.

5. The method according to claim 3, wherein the request is received from the mobile terminal via the proximity service function of the visiting network, and the merged authorization information is provided to the mobile terminal via proximity service function of the visiting network.

6. The method according to claim 2, further comprising:
determining whether the mobile terminal is roaming; and as a result of determining that the mobile terminal is not roaming:
obtaining authorization information from a proximity service function of a local network for which proximity service authorization is requested, and
providing the mobile terminal with the merged authorization information of the home network and the local network.

7. The method according to claim 6, wherein the request is received from the mobile terminal via a home Packet Data Network Gateway, PGW, and the merged authorization information is provided to the mobile terminal via the home PGW.

8. The method according to claim 1, wherein the proximity service function of the home network communicates with the proximity service function of the visiting network and the proximity service function of the local network via a respective direct connection.

9. The method according to claim 1, wherein the proximity service function of the home network communicates with the proximity service function of the visiting network via PC7 interface and with the proximity service function of the local network communicates via PC6 interface.

10. A method for authorizing a mobile terminal to use a proximity service, the mobile terminal having a home network and the mobile terminal roaming in a visiting network, comprising:
receiving, at a first proximity service (ProSe) function residing in the visiting network, a request from the mobile terminal to obtain proximity service authorization in a local network that is different than the mobile terminal's home network, wherein the mobile terminal is roaming in the visiting network;
the first ProSe function, which resides in the visiting network, forwarding the request to a home network proximity service (HN-ProSe) function residing in the mobile terminal's home network;
the first ProSe function, which resides in the visiting network, receiving from the HN-ProSe function, which resides in the mobile terminal's home network, proximity service authorization information of the local network for which proximity service authorization is requested; and
the first ProSe function residing in the visited network providing to the mobile terminal the authorization information received from the HN-ProSe function residing in the mobile terminal's home network.

11. The method according to claim 10, wherein the forwarding of the request to the HN-ProSe function is performed via a ProSe proxy and the receiving of said authorization information is performed via the ProSe proxy.

12. A method performed by a mobile terminal of requesting authorization to use a proximity service, comprising:
the mobile terminal submitting a connection request to obtain a connection, wherein a core network node is configured to receive and process the connection request;
the mobile terminal receiving a response to the connection request, wherein the response is transmitted by the core network node, and the response comprises address information for a proximity service (ProSe) function to which the mobile terminal should submit a proximity service authorization request; and
using the address information for the ProSe function, the mobile terminal submitting to the proximity service function the proximity service authorization request, wherein
the connection request is a request for establishing a Packet Data Network (PDN) connection and the core network node is a Packet Data Network Gateway (PGW), and
said response comprises a destination address in a Protocol Configuration Options, PCO, field, wherein the destination address is one of: i) a destination address of a visiting network proximity service function in case the mobile terminal is roaming and ii) a destination address of a home network proximity service function in case the mobile terminal is non-roaming.

13. A method performed by a core network node, comprising:
receiving a connection request transmitted by mobile terminal; and
submitting a response to the connection request, the response comprising address information for a proximity service function to which the mobile terminal should submit a proximity service authorization request, wherein
the method further comprise determining whether the mobile terminal is roaming in a visiting network,
said response comprises a destination address in a Protocol Configuration Options (PCO) field, and
the destination address is one of: i) a destination address of a home network proximity service function in case the mobile terminal is non-roaming and ii) a destination address of a visiting network proximity service function in case the mobile terminal is roaming.

14. The method of claim 13, wherein the core network node is one of a Mobility Management Entity (MME) and a Packet Data Network Gateway (PGW).

15. The method according to claim 14, wherein the core network node is the MME.

16. A home network proximity service (HN-ProSe) function configured to authorize a mobile terminal to use a proximity service, wherein the mobile terminal has a home network and the HN-ProSe function resides in the mobile terminal's home network, the HN-ProSe function comprising:
a processor; and
a memory coupled to the processor, wherein the HN-ProSe function is configured such that, in response to the HN-ProSe function receiving a request from the mobile terminal to obtain ProSe authorization in another network that is not the home network, the HN-ProSe function:
i) obtains authorization information from a ProSe function of the other network for which proximity service authorization is requested; and
ii) provides the mobile terminal with authorization information required for authorization with said other network for which the request is made.

17. The HN-ProSe function according to claim 16, wherein the authorization information provided to the mobile terminal comprises merged authorization information that comprises authorization information of the home network and the authorization information.

18. The HN-ProSe function according to claim 17, further being operative to:
  determine whether the mobile terminal is roaming; and if so:
    obtain authorization information from a proximity service function of a visiting network for which proximity service authorization is requested, and
    provide the mobile terminal with the merged authorization information of the home network and the visiting network.

19. The HN-ProSe function according to claim 18, further being operative to:
  obtain authorization information from a proximity service function of a local network for which proximity service authorization is requested, and
  providing the mobile terminal with the merged authorization information of the home network, the visiting network and the local network.

20. The HN-ProSe function according to claim 18, wherein the request is received from the mobile terminal via the proximity service function of the visiting network, and the merged authorization information is provided to the mobile terminal via proximity service function of the visiting network.

21. The HN-ProSe function according to claim 17, further being operative to:
  determine whether the mobile terminal is roaming; and if not:
    obtain authorization information from a proximity service function of a local network for which proximity service authorization is requested, and
    provide the mobile terminal with the merged authorization information of the home network and the local network.

22. The HN-ProSe function according to claim 21, wherein the request is received from the mobile terminal via a home Packet Data Network Gateway, PGW, and the merged authorization information is provided to the mobile terminal via the home PGW.

23. The HN-ProSe function according to claim 16, further being operative to:
  communicate with the proximity service function of the visiting network and the proximity service function of the local network via a respective direct connection.

24. The HN-ProSe function according to claim 16, further being operative to:
  communicate with the proximity service function of the visiting network via PC7 interface and with the proximity service function of the local network communicates via PC6 interface.

25. A visiting network proximity service (VN-ProSe) function configured to authorize a mobile terminal to use a proximity service, the VN-PRosSe function residing in a visiting network and comprising a processing unit and a memory, said memory containing instructions executable by said processing unit, wherein the VN-ProSe function is operative to:
  receive a request from the mobile terminal to obtain proximity service authorization in a local network that is different than the mobile terminal's home network, wherein the mobile terminal is roaming in the visiting network in which the VN-ProSe function resides;
  forward the request to a home network proximity service (HN-ProSe) function residing in the mobile terminal's home network;
  receive from the HN-ProSe function, which resides in the mobile terminal's home network, proximity service authorization information of the local network for which proximity service authorization is requested; and
  provide to the mobile terminal the authorization information received from the HN-ProSe function residing in the mobile terminal's home network.

26. The VN-ProSe function according to claim 25, further comprising:
  a proximity service proxy operative to forward the request to the home network proximity service function, and to receive said authorization information.

27. A mobile terminal configured to request authorization to use a proximity service, the mobile terminal comprising a processing unit and a memory, said memory containing instructions executable by said processing unit, wherein said mobile terminal is operative to:
  submit a connection request to obtain a connection, wherein a core network node is configured to receive and process the connection request;
  receive a response to the connection request, wherein the response is transmitted by the core network node, and the response comprises address information for a proximity service (ProSe) function to which the mobile terminal should submit a proximity service authorization request; and
  using the address information for the ProSe function, submit to the proximity service function the proximity service authorization request.

28. The mobile terminal according to claim 27, further being operative to, when submitting the request:
  establish a Packet Data Network, PDN, connection with a Packet Data Network Gateway, PGW.

29. The mobile terminal according to claim 27, wherein said response is configured to comprise a destination address of a visiting network proximity service function in a Protocol Configuration Options, PCO, field in case the mobile terminal is roaming.

30. The mobile terminal according to claim 27, wherein said response is configured to comprise a destination address of a home network proximity service function in a Protocol Configuration Options, PCO, field in case the mobile terminal is non-roaming.

31. A core network node (CNN) configured to address proximity service functions, the CNN comprising a processing unit and a memory, said memory containing instructions executable by said processing unit, wherein said CNN is operative to:
  receive a connection request transmitted by mobile terminal; and
  submit a response to the connection request, the response comprising address information for a proximity service function to which the mobile terminal should submit a proximity service authorization request, wherein
  said response comprises a destination address in a Protocol Configuration Options (PCO),
  the destination address is one of: i) a destination address of a visiting network proximity service function in case the mobile terminal is roaming and ii) a destination address of a home network proximity service function in case the mobile terminal is non-roaming.

32. The CNN of claim 31, wherein the CNN is one of a Mobility Management Entity (MME) and a Packet Data Network Gateway (PGW).

33. The CNN according to claim 32, wherein said response is configured to comprise a destination address of a home network proximity service function in a Protocol Configuration Options, PCO, field in case the mobile terminal is non-roaming.

34. A computer program product comprising a non-transitory computer readable medium storing computer-executable instructions for causing a device to perform the method of claim 1.

35. A computer program product comprising a non-transitory computer readable medium storing a computer executable instructions for causing a device to perform the method of claim 10.

36. A method for authorizing a mobile terminal to use a proximity service, wherein the mobile terminal has a home network, comprising:

receiving, at first proximity service function residing in the mobile terminal's home network, a request transmitted by the mobile terminal for obtaining proximity service authorization;

the first proximity service function residing in the mobile terminal's home network determining whether the mobile terminal is roaming in a visited network;

in response to determining that the mobile terminal is roaming in the visited network, the first proximity service function residing in the mobile terminal's home network obtaining proximity service authorization information from a second proximity service function residing in the visited network; and the first proximity service function residing in the mobile terminal's home network providing to the mobile terminal authorization information comprising the proximity service authorization information obtained from the second proximity service function residing in the visited network.

37. The method of claim 36, further comprising:

the first proximity service function residing in the mobile terminal's home network obtaining proximity service authorization information from a third proximity service function residing in a local network, wherein the authorization information provided to the mobile terminal further comprises the proximity service authorization information obtained from the third proximity service function residing in the local network.

* * * * *

UNITED STATES PATENT AND TRADEMARK OFFICE
CERTIFICATE OF CORRECTION

PATENT NO. : 9,906,959 B2  
APPLICATION NO. : 15/100534  
DATED : February 27, 2018  
INVENTOR(S) : Rydnell et al.

Page 1 of 1

It is certified that error appears in the above-identified patent and that said Letters Patent is hereby corrected as shown below:

In the Specification

In Column 13, Line 1, delete "step 404," and insert -- step S404, --, therefor.

In Column 13, Line 16, delete "proxy no" and insert -- proxy --, therefor.

In the Claims

In Column 17, Line 55, in Claim 25, delete "VN-PRosSe" and insert -- VN-ProSe --, therefor.

Signed and Sealed this  
Nineteenth Day of June, 2018

Andrei Iancu  
*Director of the United States Patent and Trademark Office*